Aug. 21, 1962  YUKIO MIWA  3,049,974
EYEGLASS FRAMES AND THE LIKE
Filed March 3, 1960
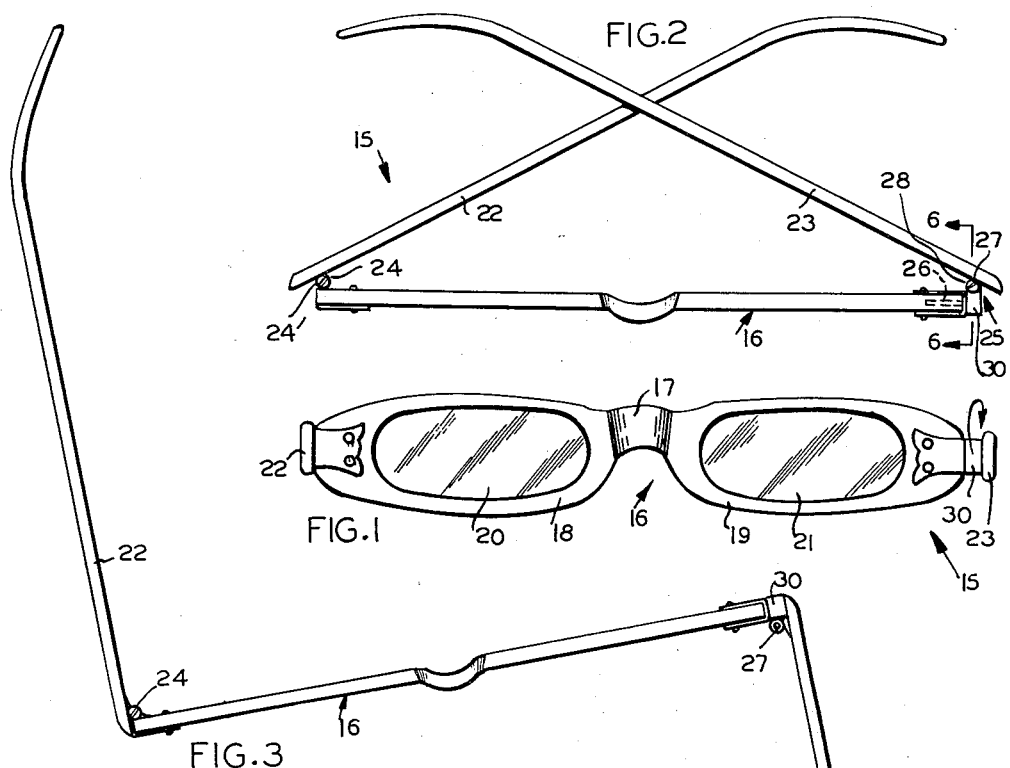
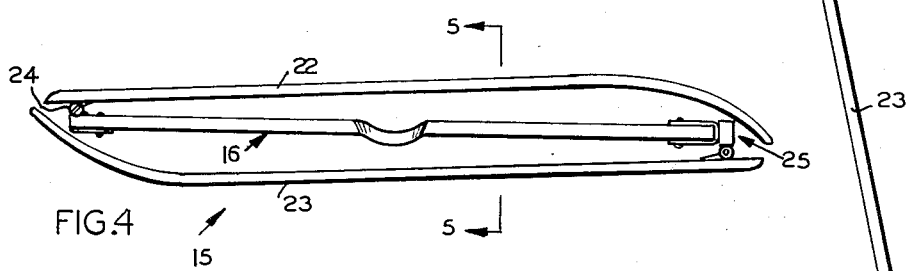
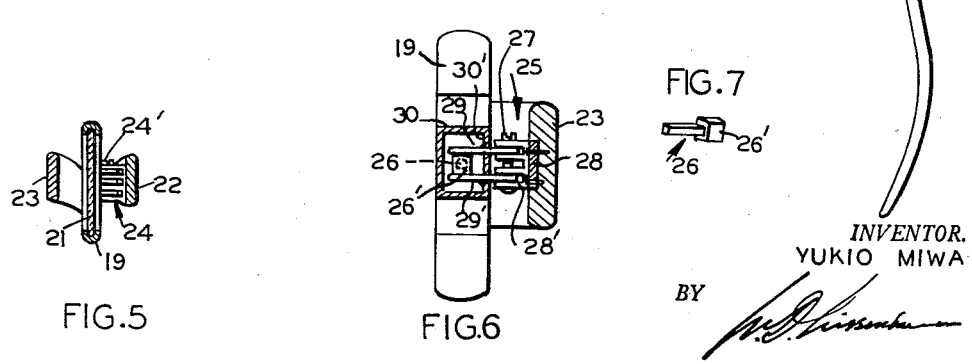
INVENTOR.
YUKIO MIWA
BY
ATTORNEY

3,049,974
EYEGLASS FRAMES AND THE LIKE
Yukio Miwa, Tokyo, Japan, assignor to
Herman Goodman, New York, N.Y.
Filed Mar. 3, 1960, Ser. No. 12,532
1 Claim. (Cl. 88—53)

The present invention relates to eyeglass frames of the type having a hinged temple at each side end of the front frame part which holds the lenses.

Heretofore, when these eyeglasses were folded, the temples lie in back of and across the lenses, leaving the front of the lenses entirely exposed. The front surfaces of the lenses became scratched, scraped and blurred and even in the act of being inserted into their case, the lenses in wiping the case wall, would be subject to some abasive action.

It is therefore the principal object of this invention to provide a novel and improved eyeglass frame construction in which when folded, the temples wil guard the lenses against surface damage.

Another object thereof is to provide a novel and improved eyeglass construction of the character mentioned which guards the lenses from surface damage regardless of how and where they may be placed in folded condition in their normal handling and which can be safely carried in a pocket or hand bag, even without a case.

A further object of this invention is to provide a novel and improved eyeglass construction of the type set forth having the attributes mentioned, which are reasonable in cost, easy to manufacture, simple to manipulate and efficient in carrying out the purposes for which they are designed.

Other objects and advantages will become apparent as this disclosure proceeds.

Essentially, in the practice of this invention, for normal use of the eyeglasses, its temples extend rearwardly of the front frame part and are swingable to lie behind and across the lenses as is usual. However, provision is made so that one of the temples can be swung to lie in front of and across the lenses. One form of construction to accomplish this is to have one of the temple hinges swivelled on the front frame part, on a horizontal axis parallel to the lens plane. In a prefered construction, a means is provided to releasably hold that temple whose hinge is swivelled, at its normal use position and also at a half turn about the swivel axis from the normal use position of such temple.

In the accompanying drawing forming part of this specification, similar characters of reference indicate corresponding parts in all the views.

FIG. 1 is a front view of a pair of eyeglasses embodying the teaching of this invention. Here, the temples extend straight backwardly from the front frame part which carries the lenses.

FIG. 2 is a top plan view of FIG. 1, except that the temples are shown partly swung from their normal use positions.

FIG. 3 is a top plan view of said eyeglasses, showing that temple whose hinge is swivelled, swung a half turn from its normal use position.

FIG. 4 is a top plan view of said eyeglasses, showing folded condition.

FIG. 5 is a section taken at line 5—5 in FIG. 4.

FIG. 6 is a magnified partial section taken at line 6—6 in FIG. 2.

FIG. 7 is a fragmentary perspective view of a component associated with the swivelled hinge.

In the drawing, the numeral 15 designates generally an eyeglass frame consisting essentially of the unitary front frame part denoted generally by the numeral 16 which comprises a central nose piece or bridge 17 connecting the lens rims 18, 19 for the lenses 20, 21 and there are the usual temples 22 and 23, which is use, extend rearwardly of the front frame part 16. The temple 22 is hinged in the usual manner at its forward end, to one side end of the front frame part by means of the hinge 24, for swinging movement to and fro from behind and across the lenses 20, 21 to a position substantially straight back from said frame part 16, that is, from its folded position as shown in FIG. 4 to its use position as shown in FIG. 3. For the other temple 23 which is at the other side end of the front frame part 16, there is a hinge structure denoted generally by the numeral 25 which is swivelled to said frame part end for rotation about the fixed axis pin 26; such axis being horizontal and parallel to the plane of the frame part 16.

One form such swivelled hinge structure 25 may assume, comprises a hinge whose leaves are hingedly associated by the hinge pin 27. One of these leaves which is denoted by the numeral 28, is fixed to the temple 23. In FIG. 6, this leaf is shown to include a number of pierced spaced tines like 28'. The other leaf of this hinge structure 25 has two pierced, spaced tines 29, 29', which are between tines of leaf 28; the hinge pin 27 being through all said tines. The tines 29, 29' extend into a box-like item 30, are welded only to the wall 30' thereof which they pierce so as to be a unitary structure with said box 30, and extend therein free in cantilever fashion to engage the opposite flats of the square head 26' of the pin 26; said tines 29, 29' having resilient quality. Said box 30 is swivelled, meaning rotatably mounted on said pin 26 which is fixed into the body of the front frame part 16. Said temple 23 is thereby hinged to the frame part 16 for usual swing movement about the hinge axis 27 (like the temple 22 about its similar hinge pin 24') and said temple 23 is also afforded swivel movement on said frame part 16, about the axis 26. The pin 26 is so positioned that the flats of its square head 26' are horizontal and vertical respectively.

Starting with this article in its condition shown in FIG. 2, these eyeglasses are usable in normal manner. The temples are swingable to be straight rearward of the front frame part 16 to use position, or they are swung so that both lie in back of and across the lenses 20, 21 as has been the common practice. In such movements, the temple 22 swings about the hinge axis 24' while the temple 23 swings about the hinge axis 27. Now, to fold the frame 15 to the condition shown in FIG. 4, the temple 22 is swung on hinge axis 24' to lie in back of and across the lenses 20, 21. The temple 23 is swung a half turn about the swivel axis pin 26, to its position shown in FIG. 3, and then swung about the hinge axis pin 27, to lie in front of and across the lenses as in FIG. 4.

Folded as in FIG. 4, the temples encircle the rigid front frame part 16 and the lenses are protected from becoming marred. These eyeglasses may be carried in such folded condition in a pocket or handbag and they need no case.

In the embodiment shown, the vertical axis of each of the lenses 20, 21 is about twice the width of a temple and said temples cross the horizontal mid-sections of the lenses. The advantages of this invention are of course applicable to eyeglasses having lenses of any shape or size and the relative dimensions mentioned may be otherwise as shown and this invention may be practiced for all kinds of eyeglasses, sunglasses and goggles fitted with temples and same are protected even where the temples cross the front lens-carrying part anywhere, as is readily understandable to those versed in the art, without further illustration.

This invention is capable of numerous forms and various applications without departing from the essential features herein disclosed. It is therefore intended and desired that the embodiment herein shall be deemed merely illustrative and not restrictive and that the patent shall cover all patentable novelty herein set forth; reference being had to the following claim rather than to the specific description herein to indicate the scope of this invention.

I claim:

In an eyeglass frame or the like, a rigid front portion to include lenses, two temples associated with said front portion by hinge structures respectively at each side end of said front portion; each temple extending rearwardly from said front portion and swingable to lie behind and along a line from side end to side end of said front portion; one of said hinge structures comprising first and second parts in pivotal relation; the first hinge part being secured to the associated temple and the second hinge part being pivotally mounted on a pin the axis of which is substantially parallel to the plane of the lenses; said pin being substantially horizontal when the frame is in normal use position, whereby such temple is swingable about said pin to lie in front of said front portion, said pin extending in part exterior of said front portion; said exterior part having opposite flat faces; the second hinge part having a flat resilient element which is an integral extension of the hinge leaf portion of said second hinge part, extending in contact with one of said faces, in face-to-face relation when the temple which is adapted to be in front of said front part is positioned extending rearwardly from said front part and when it has been moved a half turn, said flat resilient element is in face-to-face contact with the other of said faces of said exterior part.

References Cited in the file of this patent

FOREIGN PATENTS 458,990     Great Britain _____ Dec. 31, 1936

OTHER REFERENCES

"Manufacturing Optician," publication, vol. 3, Issue 10, page 674, July 1950.